(12) United States Patent
Park

(10) Patent No.: US 11,799,349 B2
(45) Date of Patent: Oct. 24, 2023

(54) MOTOR

(71) Applicant: LG INNOTEK CO., LTD., Seoul (KR)

(72) Inventor: Young Dae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 259 days.

(21) Appl. No.: 17/288,987

(22) PCT Filed: Oct. 29, 2019

(86) PCT No.: PCT/KR2019/014364
§ 371 (c)(1),
(2) Date: Apr. 27, 2021

(87) PCT Pub. No.: WO2020/091378
PCT Pub. Date: May 7, 2020

(65) Prior Publication Data
US 2021/0384796 A1 Dec. 9, 2021

(30) Foreign Application Priority Data
Oct. 31, 2018 (KR) .................. 10-2018-0132080

(51) Int. Cl.
*H02K 5/15* (2006.01)
*H02K 5/173* (2006.01)
(Continued)

(52) U.S. Cl.
CPC .......... *H02K 5/1735* (2013.01); *H02K 7/085* (2013.01); *H02K 21/22* (2013.01)

(58) Field of Classification Search
CPC ....... H02K 5/1735; H02K 7/085; H02K 21/22
(Continued)

(56) References Cited

U.S. PATENT DOCUMENTS

| 4,259,603 | A  | * | 3/1981  | Uchiyama | H02K 1/2786 |
|           |    |   |         |          | 310/90      |
| 2006/0267435 | A1 | * | 11/2006 | Lin | H02K 5/1735 |
|           |    |   |         |          | 310/90      |
| 2016/0305527 | A1 |  | 10/2016 | Chuo et al. | |

FOREIGN PATENT DOCUMENTS

| JP | 08-126235 | 5/1996 |
| JP | 2005-176597 | 6/2005 |

(Continued)

OTHER PUBLICATIONS

International Search Report dated Feb. 5, 2020 issued in Application No. PCT/KR2019/014364.
(Continued)

*Primary Examiner* — Terrance L Kenerly
(74) *Attorney, Agent, or Firm* — KED & ASSOCIATES, LLP

(57) ABSTRACT

The present invention may provide a motor including a rotary shaft, a yoke coupled to the rotary shaft, a stator disposed between the rotary shaft and the yoke, a magnet disposed between the stator and the yoke, a bearing housing disposed between the stator and the rotary shaft, a first bearing disposed between the yoke and the bearing housing, and a second bearing disposed between the bearing housing and the rotary shaft, wherein the stator includes a stator core and a first insulator and a second insulator which are coupled to the stator core, a portion of the first insulator is disposed between the first bearing and the stator core, and a portion of the second insulator is in contact with the bearing housing.

9 Claims, 16 Drawing Sheets

(51) Int. Cl.
*H02K 7/08* (2006.01)
*H02K 21/22* (2006.01)

(58) Field of Classification Search
USPC .................................................. 310/90, 174
See application file for complete search history.

(56) References Cited

FOREIGN PATENT DOCUMENTS

| | | |
|---|---|---|
| JP | 2006-333696 | 12/2006 |
| JP | 6100422 | 3/2017 |
| KR | 10-1999-0065718 | 8/1999 |
| KR | 10-2009-0106140 | 10/2009 |

OTHER PUBLICATIONS

Korean Office Action dated May 20, 2023 issued in Application No. 10-2018-0132080.
Chinese Office Action dated May 24, 2023 issued in Application No. 201980071514.7.

\* cited by examiner

[FIG. 1]
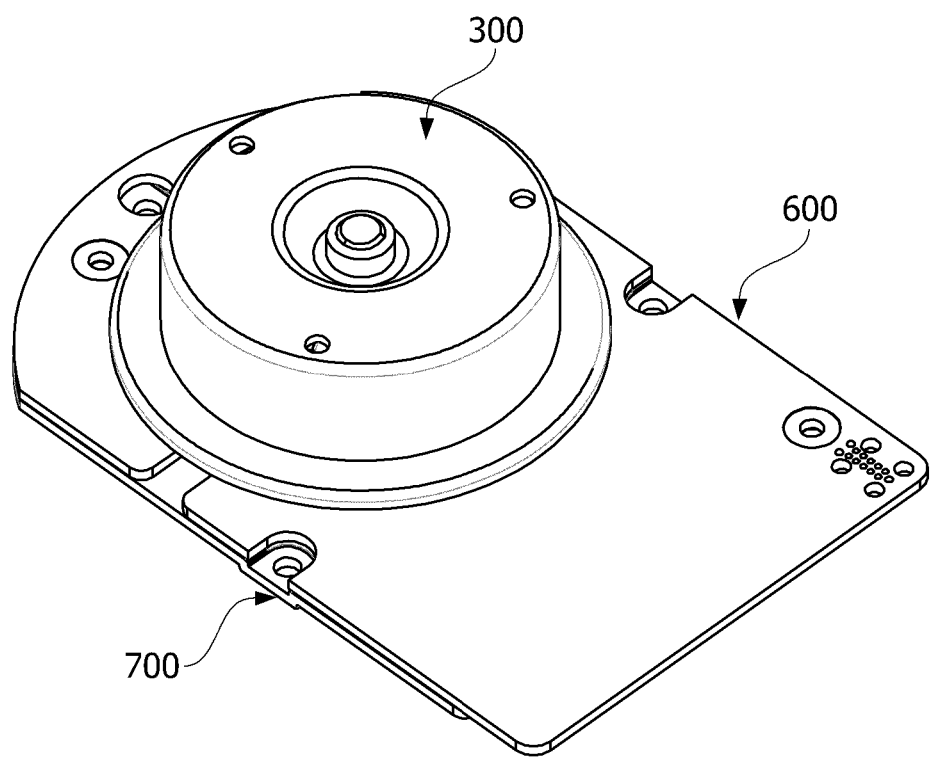

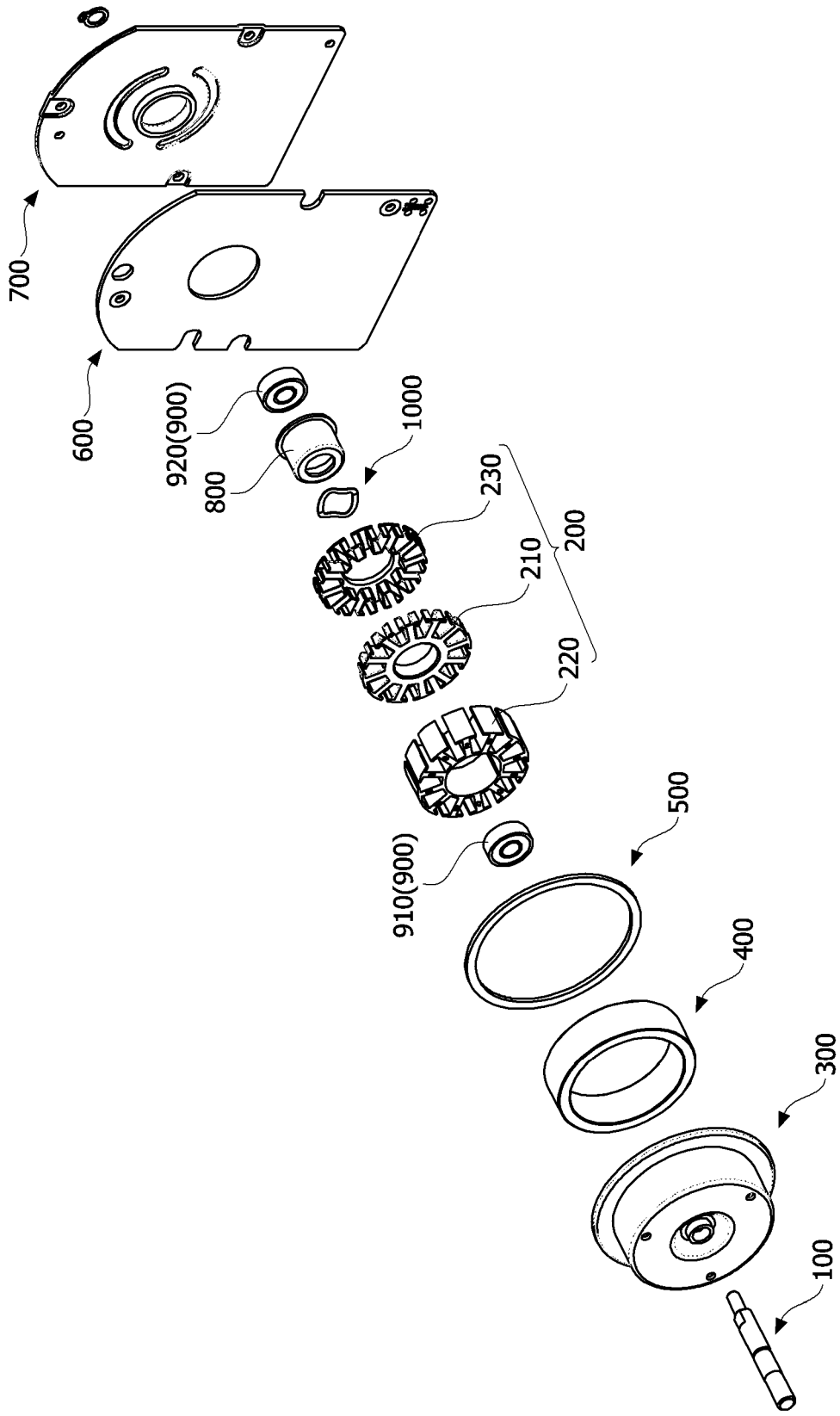
[FIG. 2]

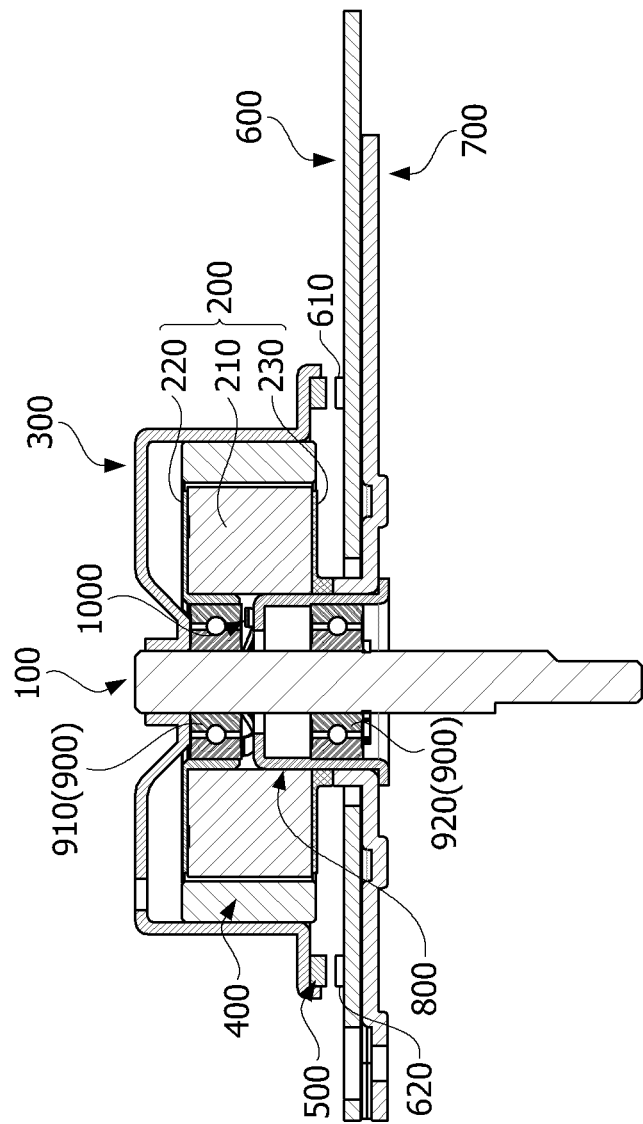
[FIG. 3]

[FIG. 4]
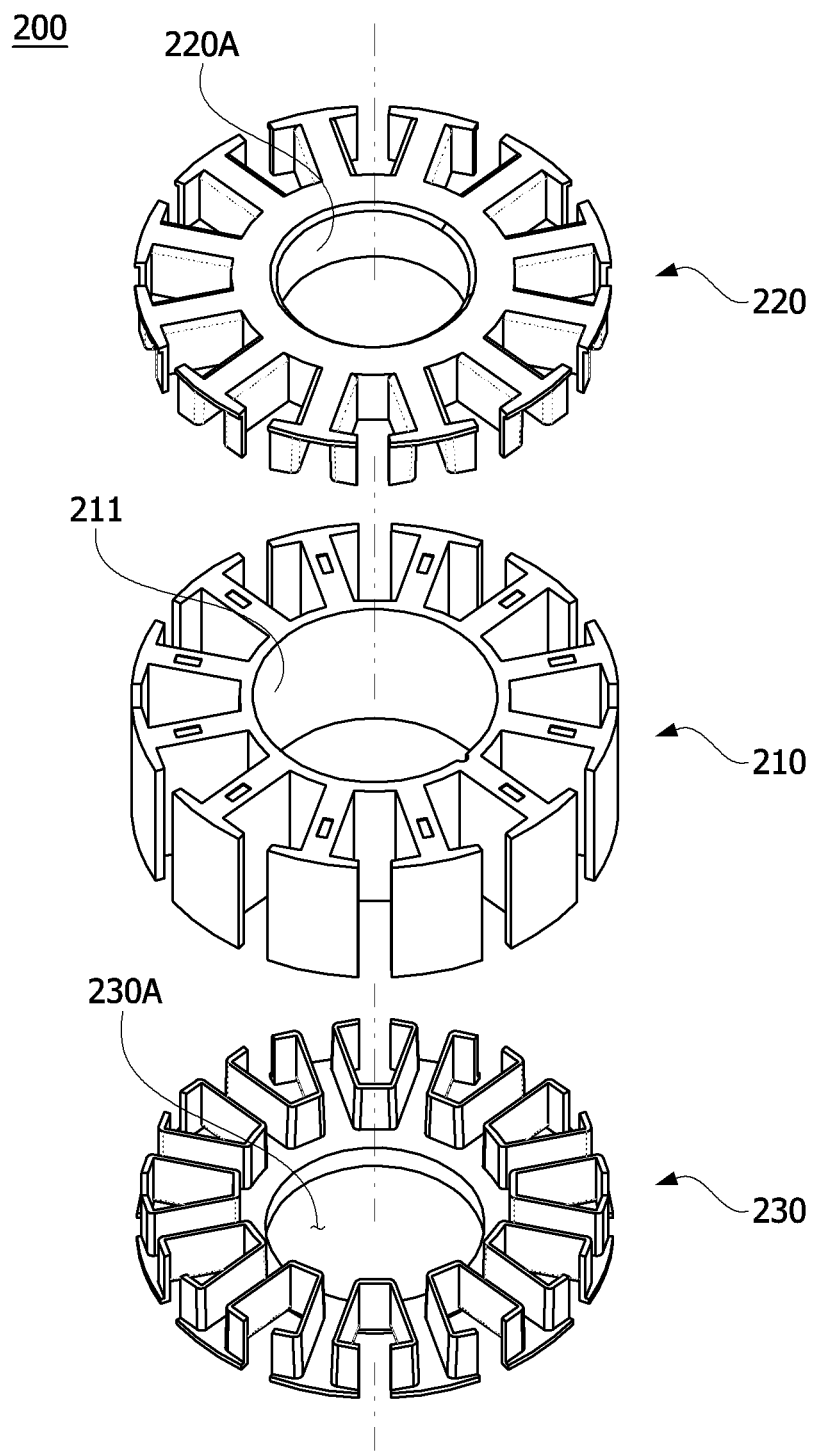

[FIG. 5]
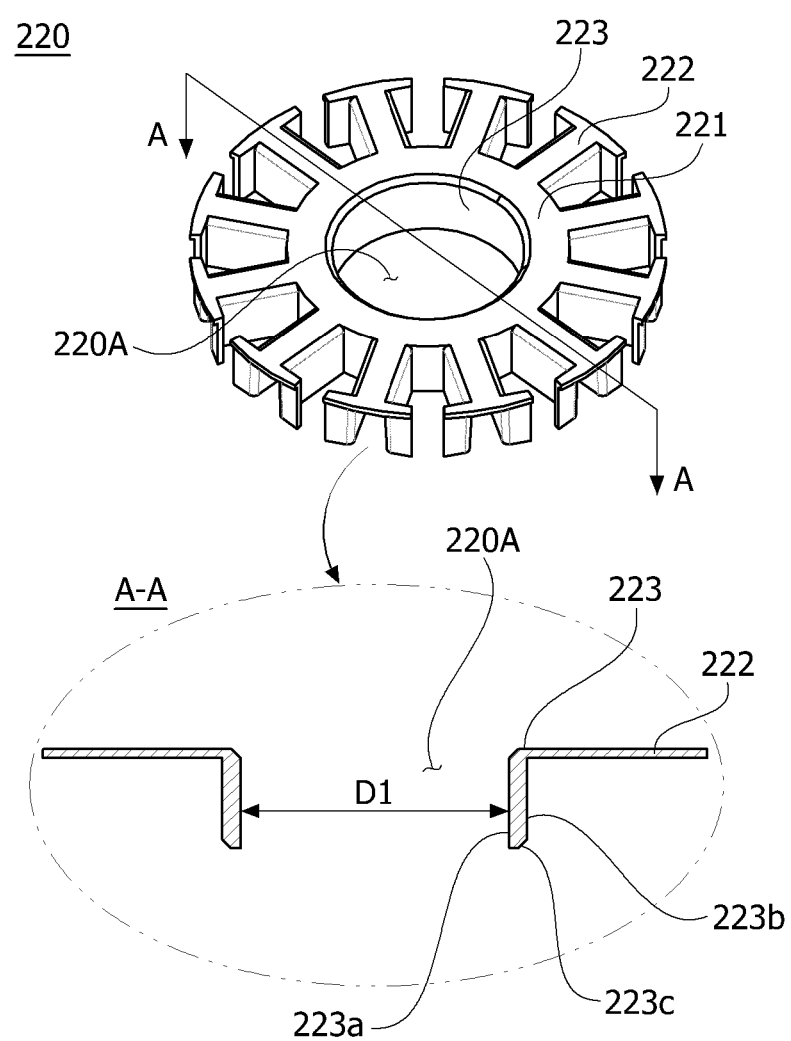

[FIG. 6]
230A
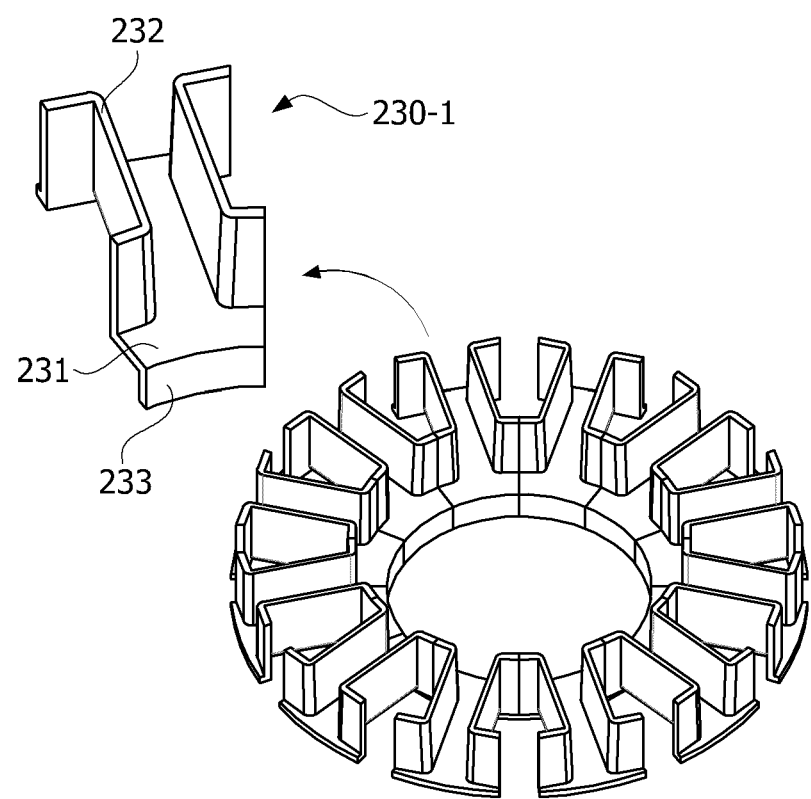

[FIG. 7]
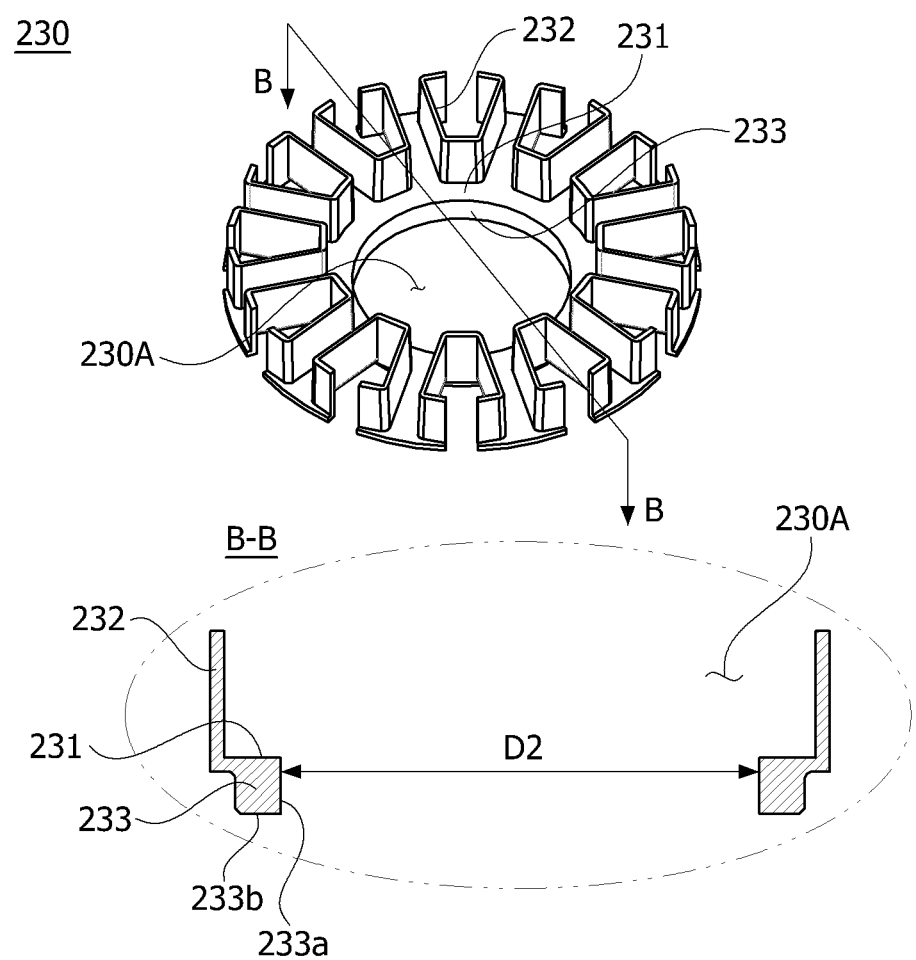

[FIG. 8]
230B
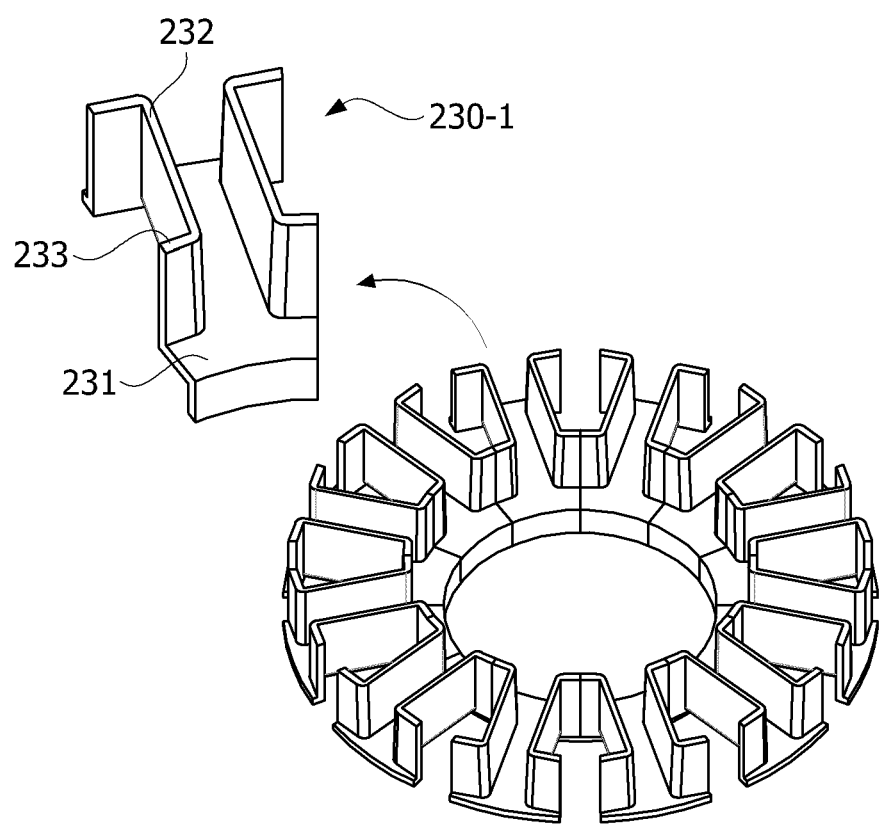

[FIG. 9]
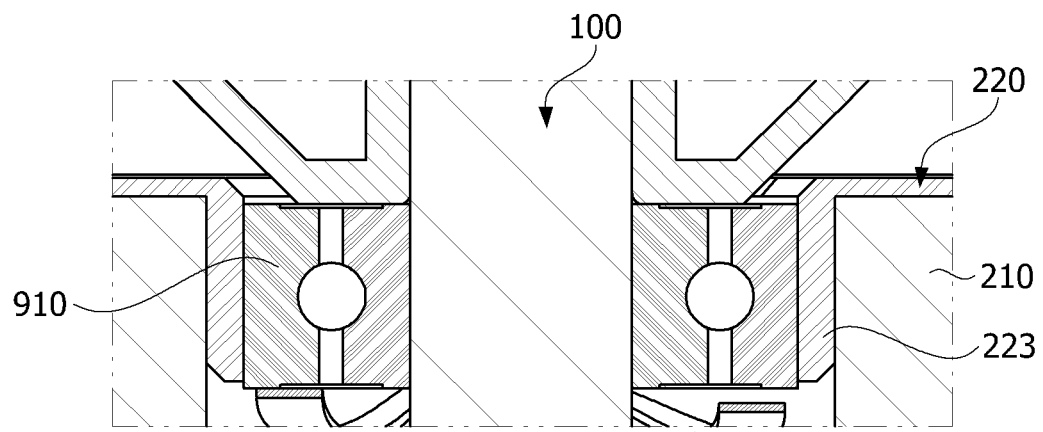

[FIG. 10]
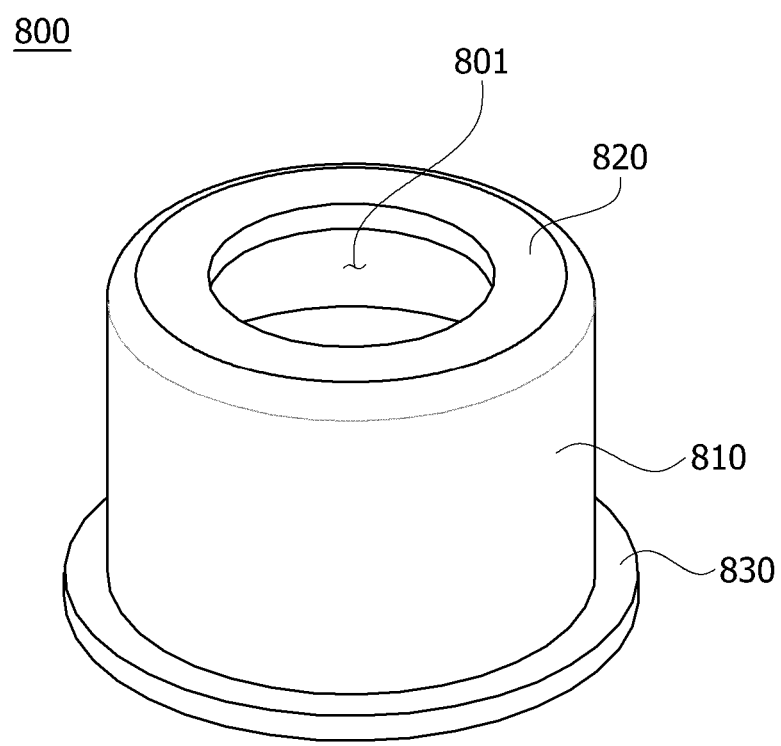

[FIG. 11]
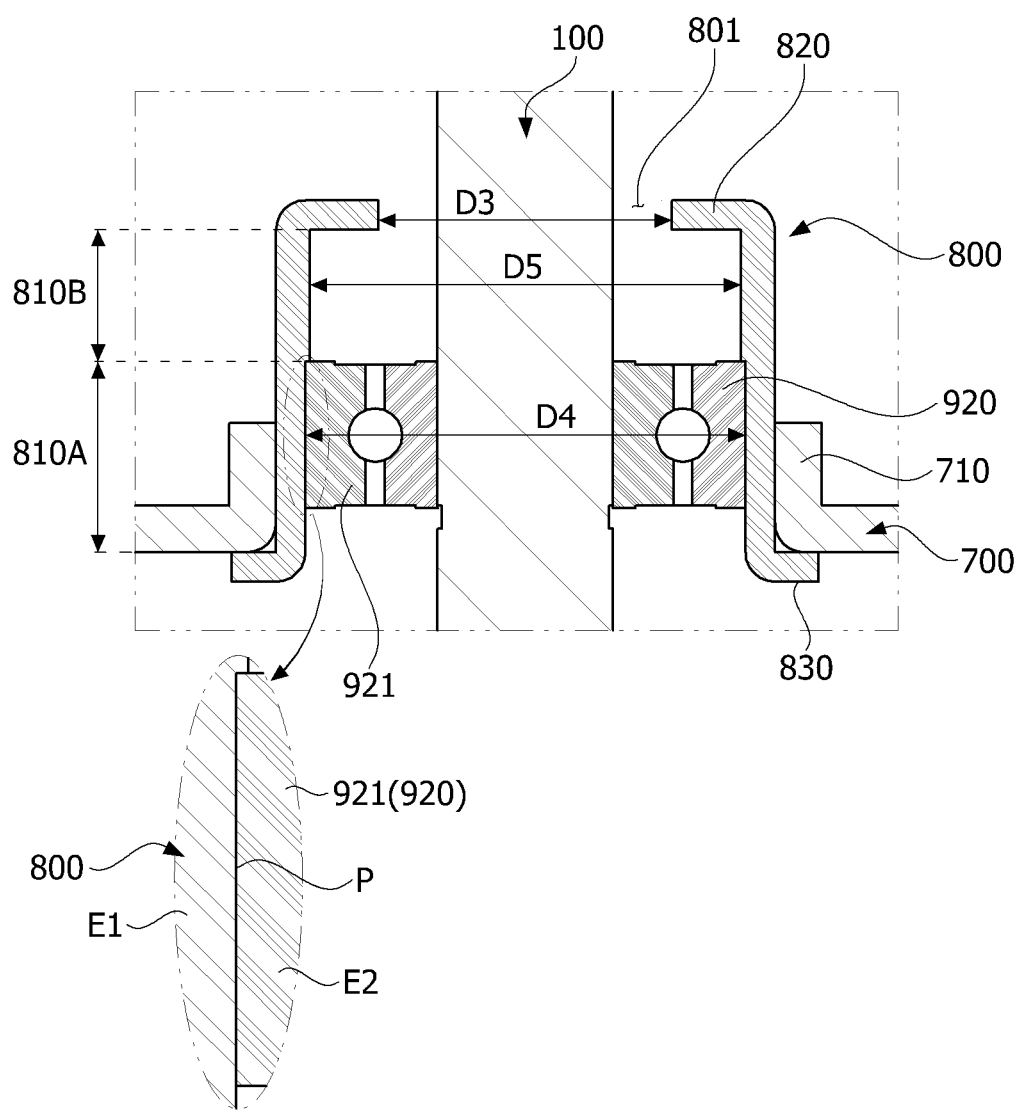

[FIG. 12]
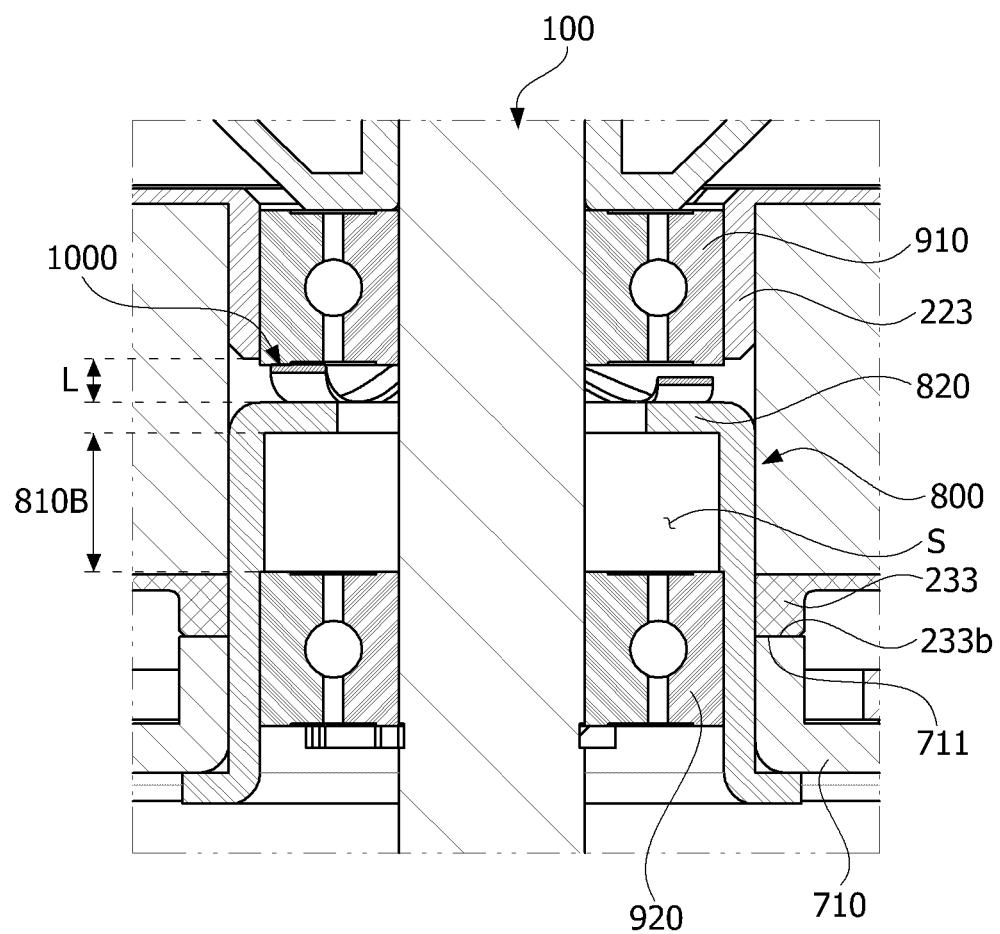

[FIG. 13]
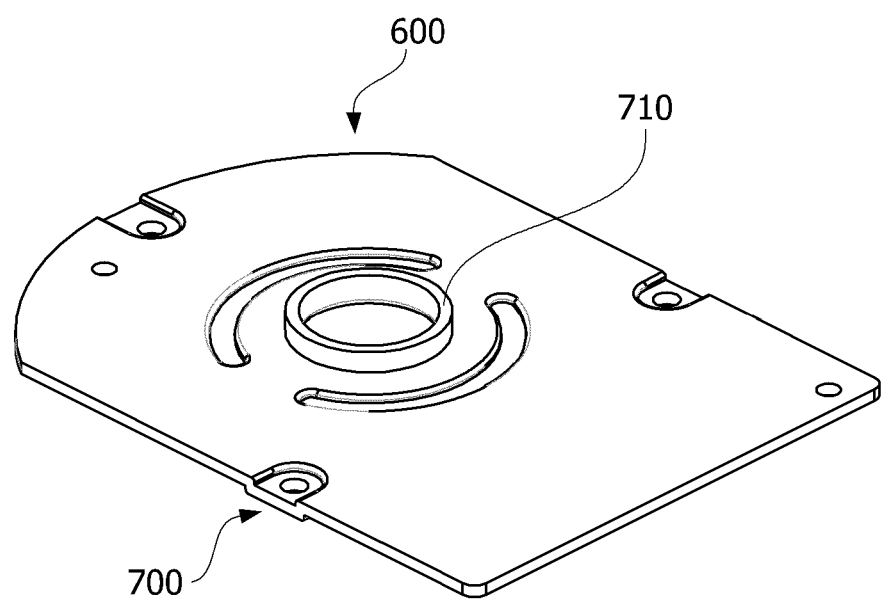

[FIG. 14]
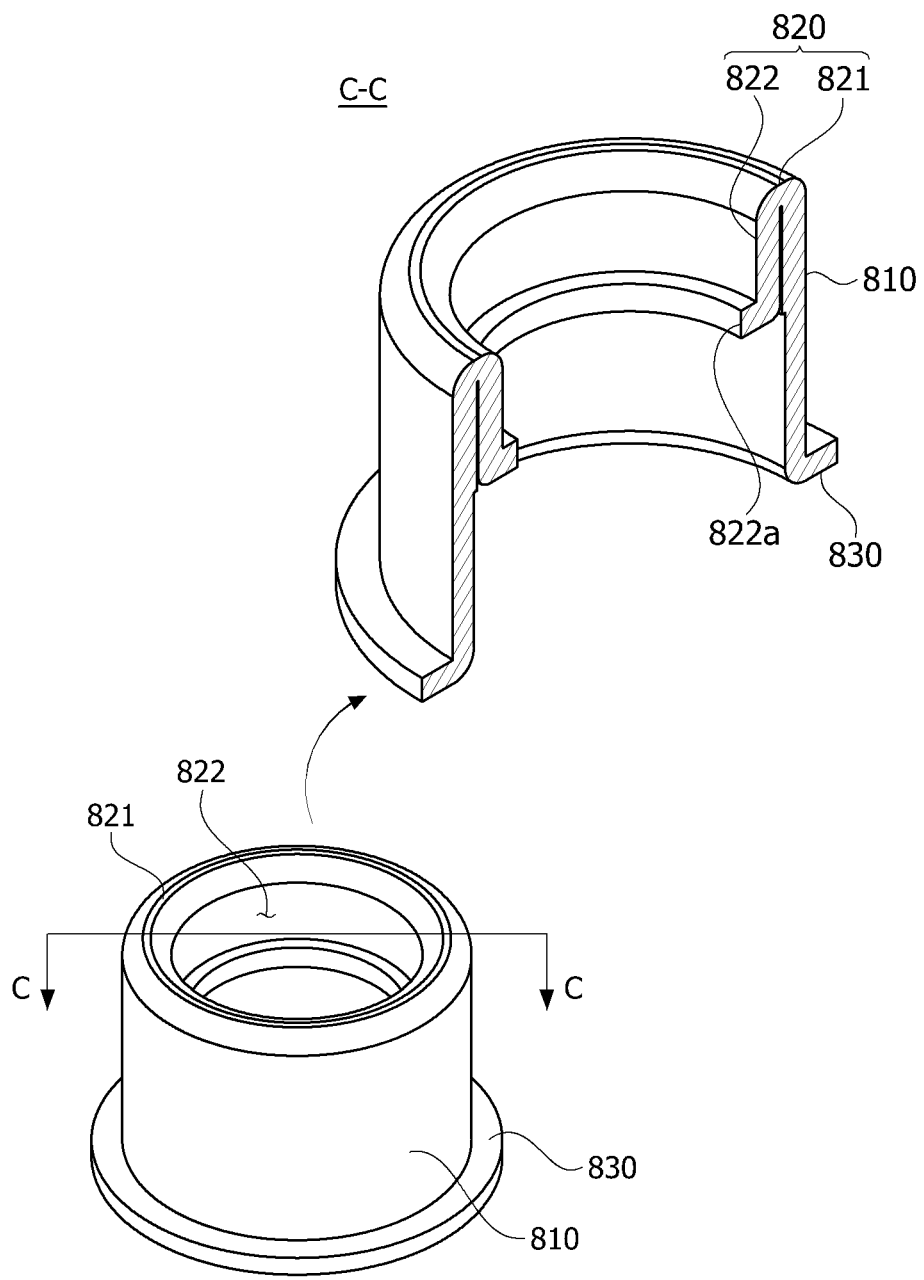

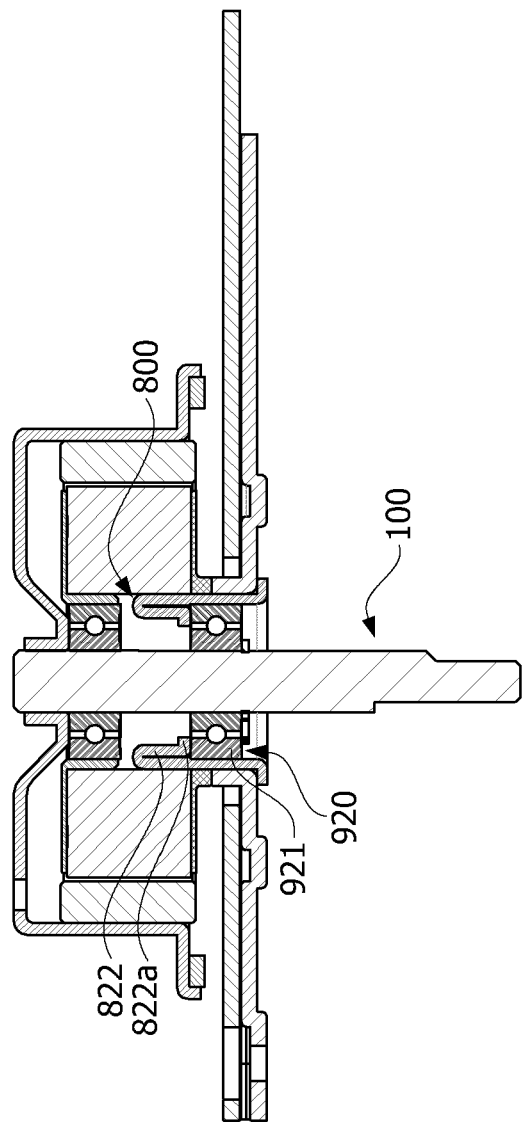

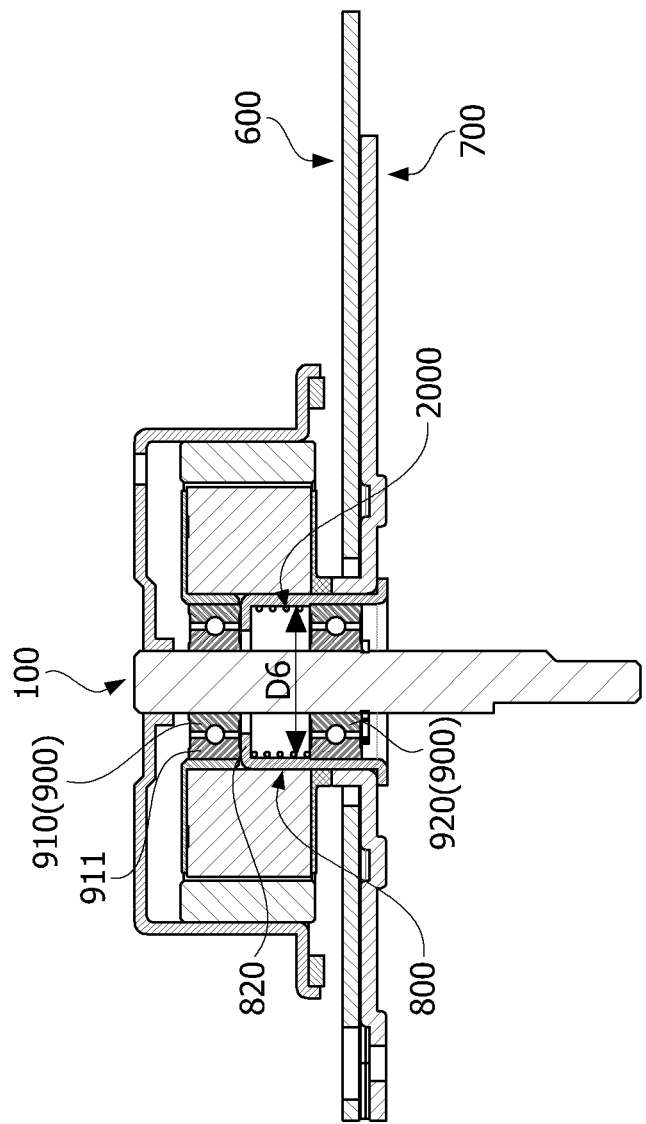

MOTOR

CROSS-REFERENCE TO RELATED PATENT APPLICATIONS

This application is a U.S. National Stage Application under 35 U.S.C. § 371 of PCT Application No. PCT/KR2019/014364, filed Oct. 29, 2019, which claims priority to Korean Patent Application No. 10-2018-0132080, filed Oct. 31, 2018, whose entire disclosures are hereby incorporated by reference.

TECHNICAL FIELD

The present invention relates to a motor.

BACKGROUND ART

A motor may include a rotor, a stator, and a shaft. The shaft is coupled to the rotor. The rotor may be disposed outside the stator. Due to an electromagnetic interaction between the rotor and the stator, the rotor is rotated, and when the rotor is rotated, the shaft is rotated.

Such a motor may be used as a driving source configured to rotate a sensor device (for example, a light detection and ranging (LiDAR) device). The shaft of the motor is connected to the sensor device. The shaft is supported by bearings. Two bearings may support upper and lower portions of the shaft. Both of the bearings may be accommodated in a bearing housing. The bearing housing is a cylindrical member formed of aluminum or brass through a cutting process. However, the cutting process has a problem in that a manufacturing cost is relatively high.

Meanwhile, since a degree of thermal expansion of the bearing housing formed of an aluminum material and a degree of thermal expansion of the bearing formed of a steel material are different in high temperature and low temperature conditions, there are the following problems. First, in the high temperature condition, a gap is generated between the bearing housing and the bearing. When the gap is generated, noise and vibration increase. Second, in the low temperature condition, since the bearing housing pushes the bearing, problems are generated in that a current applied to the motor increases and a lifetime of the bearing is reduced.

TECHNICAL PROBLEM

The present invention is directed to providing a motor with a reduced manufacturing cost.

The present invention is also directed to providing a motor in which a gap is prevented from being generated between a bearing housing and a bearing in a high temperature condition.

The present invention is also directed to providing a motor in which an increase in current applied to the motor and a decrease in lifetime of a bearing are prevented.

Objectives to be solved by the present invention are not limited to the above-described objectives, and other objectives which are not described above will be clearly understood by those skilled in the art from the following specification.

TECHNICAL SOLUTION

One aspect of the present invention provides a motor including a shaft, a yoke coupled to the shaft, a stator disposed between the shaft and the yoke, a magnet disposed between the stator and the yoke, a bearing housing disposed between the stator and the shaft, a first bearing disposed between the yoke and the bearing housing, and a second bearing disposed between the bearing housing and the shaft, wherein the stator includes a stator core and a first insulator and a second insulator which are coupled to the stator core, a portion of the first insulator is disposed between the first bearing and the stator core, and a portion of the second insulator is in contact with the bearing housing.

Another aspect of the present invention provides a motor including a shaft, a yoke coupled to the shaft, a stator disposed between the shaft and the yoke, a magnet disposed between the stator and the yoke, a bearing housing disposed between the stator and the shaft, a first bearing disposed between the yoke and the bearing housing, and a second bearing disposed in the bearing housing, wherein the stator includes a stator core and a first insulator and a second insulator which are coupled to the stator core, the first insulator includes a first opening in which the shaft is disposed, and the second insulator includes a second opening of which a diameter is greater than a diameter of the first opening.

Still another aspect of the present invention provides a motor including a shaft, a yoke coupled to the shaft, a stator disposed between the shaft and the yoke, a magnet disposed between the stator and the yoke, a bearing housing disposed between the stator and the shaft, a first bearing disposed between the yoke and the bearing housing, and a second bearing disposed in the bearing housing, wherein the stator includes a stator core having an opening and a first insulator and a second insulator which are coupled to the stator core, a portion of the first insulator extends in a first direction and is disposed in the opening of the stator core, and a portion of the second insulator extends in the first direction and is disposed outside the bearing housing.

The first insulator may include a first protrusion, the second insulator may include a second protrusion, the first protrusion may be in contact with an outer circumferential surface of the first bearing, and the second protrusion may be in contact with an outer side of the bearing housing.

The base may include a third protrusion, and the third protrusion may be in contact with an outer side of the bearing housing.

The second insulator may include a second protrusion, the second protrusion may be in contact with an outer side of the bearing housing, the base may include a third protrusion, and the third protrusion may be in contact with the outer side of the bearing housing and the second protrusion.

The bearing housing may include a hole disposed in an upper surface of the bearing housing, and an inner diameter of the hole may be greater than an inner diameter of the second bearing.

The motor may further include an elastic member disposed between the first bearing and the bearing housing, the bearing housing may include the hole disposed in the upper surface of the bearing housing, and an inner diameter of the elastic member may be greater than a diameter of the hole.

The motor may further include an elastic member disposed between the first bearing and the bearing housing, and the upper surface of the bearing housing and the second bearing may be disposed to be spaced apart from each other in a shaft direction.

The upper surface of the bearing housing may be in contact with a lower surface of the first bearing, the upper surface of the bearing housing and the second bearing may be disposed to be spaced apart from each other in the shaft direction, and the motor may further include the elastic member disposed between the upper surface of the bearing housing and the second bearing.

The bearing housing may include a first part and a second part divided on the basis of the shaft direction, the first part may be disposed under the second part, an inner diameter of the first part may be greater than an inner diameter of the second part, and the second bearing may be disposed in the first part.

The upper surface of the bearing housing may include an outer side portion and an inner side portion disposed inside the outer side portion, and the inner side portion may be bent from the outer side portion and may be in contact with an outer wheel of the second bearing.

The base housing may include a flange, and the flange may be in contact with a lower surface of the base.

The bearing housing may be formed of a material which is the same as a material of the second bearing.

ADVANTAGEOUS EFFECTS

According to embodiments, an advantageous effect is provided in that a manufacturing cost can be reduced.

An advantageous effect is provided in that a gap is prevented from being generated between a bearing housing and a bearing in a high temperature condition.

An advantageous effect is provided in that an increase in current applied to a motor and a decreased in lifetime of a bearing are prevented.

DESCRIPTION OF DRAWINGS

FIG. 1 is a perspective view illustrating a motor according to an embodiment.

FIG. 2 is an exploded perspective view illustrating the motor illustrated in FIG. 1.

FIG. 3 is a view illustrating a yoke illustrated in FIG. 2.

FIG. 4 is a view illustrating a stator illustrated in FIG. 2.

FIG. 5 is a view illustrating a first insulator.

FIG. 6 is a view illustrating a modified example of the first insulator.

FIG. 7 is a view illustrating a second insulator.

FIG. 8 is a view illustrating a modified example of the second insulator.

FIG. 9 is an enlarged view illustrating a first bearing.

FIG. 10 is a view illustrating a bearing housing.

FIG. 11 is a side cross-sectional view illustrating the motor including the bearing housing.

FIG. 12 is a view illustrating an elastic member disposed between the first bearing and the bearing housing.

FIG. 13 is a view illustrating a base.

FIG. 14 is a view illustrating a modified example of the bearing housing.

FIG. 15 is a side cross-sectional view illustrating the motor to which the modified example of the bearing housing is applied illustrated in FIG. 14.

FIG. 16 is a view illustrating a modified example of the elastic member.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a perspective view illustrating a motor according to an embodiment, FIG. 2 is an exploded perspective view illustrating the motor illustrated in FIG. 1, and FIG. 3 is a view illustrating a yoke illustrated in FIG. 2. Hereinafter, the term "inside" refers to a direction toward a rotary shaft based on a radial direction of the motor, and the term "outside" refers to a direction opposite to "inside."

Referring to FIGS. 1 to 3, the motor according to the embodiment may include a rotary shaft 100, a stator 200, a yoke 300, a first magnet 400, a second magnet 500, a printed circuit board 600, a base 700, a bearing housing 800, and bearings 900.

The rotary shaft 100 is fixed to the yoke 300. The rotary shaft 100 may be fixedly press-fitted to a center of the yoke 300. Alternatively, the rotary shaft 100 may also be integrally formed with the yoke 300. The yoke 300 rotates along with the rotary shaft 100. The rotary shaft 100 may be connected to a sensor device configured to obtain distance information.

The stator 200 is disposed between the rotary shaft 100 and the yoke 300. The stator 200 may include a stator core 210, a first insulator 220, and a second insulator 230. The stator core 210 may include a plurality of teeth. The first insulator 220 and the second insulator 230 are disposed on the stator core 210. The first insulator 220 may be disposed on an upper portion of the stator core 210. The second insulator 230 may be disposed on a lower portion of the stator core 210. Coils may be wound around the first insulator 220 and the second insulator 230. An electrical interaction is induced between the coils and the first magnet 400.

The yoke 300 is disposed outside the stator 200. In addition, the yoke 300 is coupled to the rotary shaft 100. The rotary shaft 100 is positioned at the center of the yoke 300.

The first magnet 400 may be disposed inside the yoke 300. The first magnet 400 is for driving the yoke 300. Due to an electromagnetic interaction between the first magnet 400 and the coils wound around the stator 200, the yoke 300 is rotated. The first magnet 400 may be one annular member. Alternatively, the first magnet 400 may be formed of a plurality of divided magnets which are coupled.

The second magnet 500 may be disposed on a circumference of the yoke 300. The second magnet 500 is for detecting a position of the yoke 300 and detects one rotation of the motor to realize a constant speed driving of the motor. The second magnet 500 may have an annular shape. The second magnet 500 may be formed of a plurality of divided magnets.

The printed circuit board 600 is disposed under the stator 200. The printed circuit board 600 may include a first Hall sensor 610 (see FIG. 3) and a second Hall sensor 620. The first Hall sensor 610 detects a magnetic flux of the first magnet 400. The first Hall sensor 610 may be disposed under the first magnet 400. The second Hall sensor 620 detects a magnetic flux of the second magnet 500. The second Hall sensor 620 may be disposed under the second magnet 500.

The base 700 is disposed under the printed circuit board 600.

The bearing housing 800 includes a second bearing 920 disposed inside the bearing housing 800. The bearing housing 800 is coupled to the base 700. In addition, the bearing housing 800 is coupled to the stator core 210. A portion of the bearing housing 800 may be disposed between the stator core 210 and the rotary shaft 100.

The bearing 900 includes a first bearing 910 and the second bearing 920. The first bearing 910 may be disposed between the yoke 300 and the bearing housing 800 in a shaft direction. The first bearing 910 may be disposed between the bearing housing 800 and the rotary shaft 100 in the radial direction.

The elastic member 1000 may be disposed between the second bearing 920 and the bearing housing 800 in the shaft direction. The elastic member 1000 serves to support an axial load applied to the motor.

FIG. 4 is a view illustrating the stator illustrated in FIG. 2.

Referring to FIG. 4, the first insulator 220 covers the upper portion of the stator core 210. The second insulator 230 covers the lower portion of the stator core 210. The stator core 210 includes an opening 211 at a center thereof. The first bearing 910 is disposed in the opening 211 of the stator core 210. In addition, the first insulator 220 includes a first opening 220A at a center thereof. The second insulator 230 includes a second opening 230A at a center thereof.

FIG. 5 is a view illustrating the first insulator.

Referring to FIGS. 3 to 5, the first insulator 220 may include a body 221, teeth 222, and a first protrusion 223. The body 221 may be an annular member including the first opening 220A. The first bearing 910 is disposed inside the first opening 220A of the body 221. The teeth 222 extend outward from the body 221. The plurality of teeth 222 are provided. The coils are wound around the teeth 222. The teeth 222 are installed on the teeth of the stator core 210. The first protrusion 223 extends from the body 221 in a first direction. The first direction refers to the shaft direction and a downward direction. The first protrusion 223 is disposed between the first bearing 910 and the stator core 210.

An inner side surface 223a of the first protrusion 223 is in contact with an outer circumferential surface of the first bearing 910. An outer side surface 223b of the first protrusion 223 is in contact with an inner side surface of the stator core 210. The inner side surface 223a and the outer side surface 223b of the first protrusion 223 may be curved surfaces. The first protrusion 223 and the body 221 form the first opening 220A. A tamper 223c may be disposed at an end of the first protrusion 223. The tamper 223c is for guiding seamless insertion when the first protrusion 223 is inserted into the opening 211 of the stator core 210.

A diameter D1 of the first opening 220A may correspond to an outer diameter of the first bearing 910. In addition, the diameter D1 of the first opening 220A is smaller than a diameter D2 (see FIG. 7) of the second opening 230A. Unlike a second protrusion 233 of the second insulator 230, since the first protrusion 223 is disposed in the opening of the stator core 210, the diameter of the first opening 220A is smaller than the diameter of the second opening 230A by at least a thickness of the first protrusion 223.

FIG. 6 is a view illustrating a modified example of the first insulator.

Referring to FIG. 6, the first insulator 220 may be formed by coupling a plurality of divided insulator parts 220-1. Each of the insulator parts 220-1 may include a body 221, a tooth 222, and a first protrusion 223. The first protrusions 223 of the insulator parts 220-1 may be coupled to form the first opening 220A of the first insulator 220.

FIG. 7 is a view illustrating the second insulator.

Referring to FIGS. 3 to 7, the second insulator 230 may include a body 231, teeth 232, and the second protrusion 233. The body 231 may be an annular member including the second opening 230A. The bearing housing 800 is disposed inside the second opening 230A of the body 231. The second bearing 920 is disposed inside the bearing housing 800. The teeth 232 extend outward from the body 231. The plurality of teeth 232 are provided. The coils are wound around outer sides of the teeth 232. The teeth 232 are installed on lower portions of the teeth of the stator core 210. The second protrusion 233 extends from the body 231 in the first direction.

An inner side surface 233a of the second protrusion 233 is in contact with an outer side of the bearing housing 800. The inner side surface 233a may be a curved surface. A lower surface 233c of the second protrusion 233 is in contact with a third protrusion 710 (see FIG. 12). The second protrusion 233 and the body 231 form the second opening 230A. The diameter D2 of the second opening 230A is greater than the diameter D1 of the first opening 220A.

FIG. 8 is a view illustrating a modified example of the second insulator.

Referring to FIG. 8, the second insulator 230A may be formed by coupling a plurality of divided insulator parts 230-1. Each of the insulator parts 230-1 may include a body 231, a tooth 232, and a second protrusion 233. The second protrusions 233 of the insulator parts 230-1 are coupled to form the second opening 230A of the second insulator 230.

FIG. 9 is an enlarged view illustrating the first bearing.

Referring to FIGS. 3 and 9, among the first bearing 910 and the second bearing 920, only the second bearing 920 is disposed in the bearing housing 800. The first bearing 910 is fixed to the first insulator 220. The first bearing 910 is disposed inside the stator core 210. In addition, the first protrusion 223 is disposed between the first bearing 910 and the stator core 210. Since the first bearing 910 is fixed to the first insulator 220, a length of the bearing housing 800 may be decreased. The bearing housing 800 having a relatively short length has an advantage of facilitating manufacturing through a press process.

FIG. 10 is a view illustrating the bearing housing.

Referring to FIGS. 3 and 10, the bearing housing 800 is disposed between the stator 200 and the rotary shaft 100. The bearing housing 800 may be coupled to the opening 211 of the stator core 210 in a press-fitting manner. The bearing housing 800 may include a body 810, an upper surface 820, and a flange 830. The body 810 has a cylindrical shape. The second bearing 920 is disposed inside the body 810. The upper surface 820 may include a hole 801. The hole 801 is a hole through which the rotary shaft 100 passes. The flange 830 extends outward from a lower end of the body 810. The flange 830 may be in contact with a lower surface of the base 700. The flange 830 is for increasing a coupling force of the bearing housing 800 and the base 700.

FIG. 11 is a side cross-sectional view illustrating the motor including the bearing housing.

Referring to FIG. 11, an inner diameter D3 of the hole 801 of the bearing housing 800 is greater than an outer diameter of the rotary shaft 100. This is for allowing the rotary shaft 100 to pass through the hole 801. The body 810 of the bearing housing 800 may be divided into to a first part 810A and a second part 810B. The first part 810A is disposed under the second part 810B. An inner diameter D4 of the first part 810A is greater than an inner diameter D5 of the second part 810B. Accordingly, a stepped portion is formed at a boundary of the first part 810A and the second part 810B. The second bearing 920 is disposed in the first part 810A. There is an advantage in that a position of the second bearing 920 is determined on the basis of the stepped portion disposed at the boundary of the first part 810A and the second part 810B.

The bearing housing 800 may be formed of a steel material. The bearing housing 800 may be manufactured through a press process. Since a loss of the press process is small and a cost of the press process is cheap when compared to a cutting process, a manufacturing cost of the motor may be reduced. In addition, since the press process is facilitated in mass production of the bearing housing 800, the manufacturing cost can be further reduced. Since the bearing housing 800 fixes only the second bearing 920 among the first bearing 910 and the second bearing 920, the bearing housing 800 may be manufactured to have a short length. Accordingly, there are advantages of easily applying a press method and reducing an amount of steel used when the bearing housing 800 is manufactured to reduce the manufacturing cost of the motor.

Referring to FIG. 9, an inner side surface of the bearing housing 800 is in contact with an outer wheel 921 of the second bearing 920. In this case, the material of the bearing housing 800 is steel, and the material of the second bearing 920 is also steel. Accordingly, since a thermal expansion coefficient E1 of the bearing housing 800 is similar to a thermal expansion coefficient E2 of the second bearing 920, in a high temperature condition, there is no great difference in deformation degree between the bearing housing 800 and the second bearing 920. Accordingly, generation of a gap at a contact portion P between the inner side surface of the bearing housing 800 and the outer wheel of the second bearing 920 may be prevented. In addition, even in a low temperature condition, since there is not a great difference in deformation degree between the bearing housing 800 and the second bearing 920, the second bearing 920 is prevented from being pushed due to reduction of the bearing housing 800.

FIG. 12 is a view illustrating the elastic member disposed between the first bearing and the bearing housing.

Referring to FIG. 12, the elastic member 1000 may be a wave washer having a restoring force when pushed in the shaft direction. The elastic member 1000 is disposed between the first bearing 910 and the upper surface 820 of the bearing housing 800 in the shaft direction. The elastic member 1000 may be in contact with a lower surface of an outer wheel of the first bearing 910 and the upper surface 820 of the bearing housing 800. The second part 810B of the bearing housing 800 may be a part for securing a first separation distance L. The first separation distance L denotes a separation distance between the lower surface of the outer wheel of the first bearing 910 and the upper surface 820 of the bearing housing 800 to allow the elastic member 1000 to be in contact with both of the lower surface of the outer wheel of the first bearing 910 and the upper surface 820 of the bearing housing 800. In order to secure the first separation distance L, the upper surface 820 may be disposed at a high level, and a space such as a space S of FIG. 12 may be secured inside the bearing housing 800.

FIG. 13 is a view illustrating the base.

Referring to FIGS. 12 and 13, the base 700 includes the third protrusion 710. The third protrusion 710 protrudes upward from an upper surface of the base 700. The third protrusion 710 may be an annular member. The third protrusion 710 is in contact with an outer side of the bearing housing 800. The third protrusion 710 increases a coupling force of the bearing housing 800 and the base 700. An upper surface 711 of the third protrusion 710 may be in contact with a lower surface 233b of the second protrusion 233. Accordingly, slipping is prevented from occurring between the stator core 210 and the bearing housing 800 in the first direction. In addition, an axial load may be supported.

FIG. 14 is a view illustrating a modified example of the bearing housing, and FIG. 15 is a side cross-sectional view illustrating the motor to which the modified example of the bearing housing is applied illustrated in FIG. 14.

Referring to FIGS. 14 and 15, the upper surface 820 of a bearing housing 800 may include an outer side portion 821 and an inner side portion 822. The outer side portion 821 is connected to a body 810, and the inner side portion 822 is disposed inside the outer side portion 821. The inner side portion 822 is bent from the outer side portion 821 and in contact with the outer wheel 921 of the second bearing 920. An end portion 822a of the inner side portion 822 may have a shape bent inward to increase a contact area with the outer wheel 921 of the second bearing 920. The inner side portion 822 may fix the outer wheel 921 of the second bearing 920 so that the outer wheel 921 of the second bearing 920 is not pushed upward, and thus slipping may be prevented from occurring between the outer wheel 921 of the second bearing 920 and the inner side surface of the bearing housing 800. In addition, the inner side portion 822 may support a load in the shaft direction. In addition, due to the inner side portion 822, a position of the second bearing 920 may be determined in the shaft direction.

FIG. 16 is a view illustrating a modified example of the elastic member.

Referring to FIG. 16, an elastic member 2000 may be a compressed coil spring. The upper surface 820 of the bearing housing 800 is in contact with a lower surface of an outer wheel 911 of the first bearing 910. The upper surface 820 of the bearing housing 800 and the second bearing 920 are disposed to be spaced apart from each other in the shaft direction. The elastic member 2000 is disposed inside the bearing housing 800. For example, the elastic member 2000 is disposed between the upper surface 820 of the bearing housing 800 and the second bearing 920. In this case, an inner diameter D6 of the elastic member 2000 is greater than the diameter D3 of the hole 801 of the bearing housing 800 of FIG. 11. Since the upper surface 820 of the bearing housing 800 is in direct contact with the lower surface of the outer wheel 911 of the first bearing 910, slipping may be prevented from occurring between the first protrusion 223 and the first bearing 910. In addition, there is an advantage of being strong against an axial load. In addition, there is an advantage in that a position of the first bearing 910 is easily arranged based on the upper surface 820 of the bearing housing 800.

As described above, the motor according to one exemplary embodiment of the present invention has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:

1. A motor comprising:
a rotary shaft;
a yoke coupled to the rotary shaft;
a stator disposed between the rotary shaft and the yoke;
a magnet disposed between the stator and the yoke;
a bearing housing disposed between the stator and the rotary shaft;
a first bearing disposed between the yoke and the bearing housing; and
a second bearing disposed between the bearing housing and the rotary shaft,
wherein the stator includes a stator core, and a first insulator and a second insulator which are coupled to the stator core,
a portion of the first insulator is disposed between the first bearing and the stator core, and
a portion of the second insulator is in contact with the bearing housing,
wherein the first insulator includes a first protrusion, the second insulator includes a second protrusion, the first protrusion is in contact with an outer circumferential surface of the first bearing, and the second protrusion is in contact with an outer side of the bearing housing.

2. The motor of claim 1, wherein:
a base includes a third protrusion; and
the third protrusion is in contact with the outer side of the bearing housing and the second protrusion.

3. The motor of claim 1, further comprising an elastic member disposed between the first bearing and the bearing housing,
wherein the bearing housing includes a hole disposed in an upper surface of the bearing housing, and
an inner diameter of the elastic member is greater than a diameter of the hole.

4. The motor of claim 1, further comprising an elastic member disposed between the first bearing and the bearing housing,
wherein an upper surface of the bearing housing and the second bearing are disposed to be spaced apart from each other in a shaft direction.

5. The motor of claim 1, wherein:
the bearing housing incudes a first part and a second part divided on the basis of a shaft direction;
the first part is disposed under the second part;
an inner diameter of the first part is greater than an inner diameter of the second part; and
the second bearing is disposed in the first part.

6. The motor of claim 1, wherein:
an upper surface of the bearing housing includes an outer side portion and an inner side portion disposed inside the outer side portion; and
the inner side portion is bent from the outer side portion and is in contact with an outer wheel of the second bearing.

7. The motor of claim 1, wherein the bearing housing is formed of a material which is the same as a material of the second bearing.

8. A motor comprising:
a rotary shaft;
a yoke coupled to the rotary shaft;
a stator disposed between the rotary shaft and the yoke;
a magnet disposed between the stator and the yoke;
a bearing housing disposed between the stator and the rotary shaft;
a first bearing disposed between the yoke and the bearing housing; and
a second bearing disposed in the bearing housing,
wherein the stator includes a stator core, and a first insulator and a second insulator which are coupled to the stator core,
the first insulator includes a first opening in which the rotary shaft is disposed, and
the second insulator includes a second opening of which a diameter is greater than a diameter of the first opening,
wherein the first insulator includes a first protrusion, the second insulator includes a second protrusion, the first protrusion is in contact with an outer circumferential surface of the first bearing, and the second protrusion is in contact with an outer side of the bearing housing.

9. A motor comprising:
a rotary shaft;
a yoke coupled to the rotary shaft;
a stator disposed between the rotary shaft and the yoke;
a magnet disposed between the stator and the yoke;
a bearing housing disposed between the stator and the rotary shaft;
a first bearing disposed between the yoke and the bearing housing; and
a second bearing disposed in the bearing housing,
wherein the stator includes a stator core having an opening, and a first insulator and a second insulator which are coupled to the stator core,
a portion of the first insulator extends in a first direction and is disposed in the opening of the stator core, and
a portion of the second insulator extends in the first direction and is disposed outside the bearing housing,
wherein the first insulator includes a first protrusion, the second insulator includes a second protrusion, the first protrusion is in contact with an outer circumferential surface of the first bearing, and the second protrusion is in contact with an outer side of the bearing housing.

* * * * *